United States Patent [19]
Randazzo

[11] Patent Number: 4,687,293
[45] Date of Patent: Aug. 18, 1987

[54] METAL-ENCASED LIGHT CONDUCTOR

[75] Inventor: Matthew J. Randazzo, Tonawanda, N.Y.

[73] Assignee: Conax Buffalo Corporation, Buffalo, N.Y.

[21] Appl. No.: 813,789

[22] Filed: Dec. 27, 1985

[51] Int. Cl.$^4$ .................................................. G02B 6/44
[52] U.S. Cl. ................................ 350/96.23; 350/96.34
[58] Field of Search ............... 350/96.23, 96.29, 96.30, 350/96.33, 96.34

[56] References Cited

U.S. PATENT DOCUMENTS

| | | | |
|---|---|---|---|
| 4,334,733 | 6/1982 | Takeshima et al. | 350/96.33 |
| 4,432,605 | 2/1984 | Niiro et al. | 350/96.23 |
| 4,629,286 | 12/1986 | Fuse et al. | 350/96.23 |

Primary Examiner—Eugene R. La Roche
Assistant Examiner—James C. Lee
Attorney, Agent, or Firm—Sommer & Sommer

[57] ABSTRACT

A metal-encased light conductor having a continuous pressure boundary seal capable of use to transmit light signals in an environment having a pressure up to about 5000 psi based on a sealing length of a minimum of 6 inches and a temperature falling in the range of from about −40° C. to about 250° C., and comprising a core/clad optical fiber, coated with polyimide, surrounded by a jacket of thermoplastic resin on which there is a cured film of epoxy resin, and compressed by a surrounding mechanically reduced ductile metal sheath.

5 Claims, 1 Drawing Figure

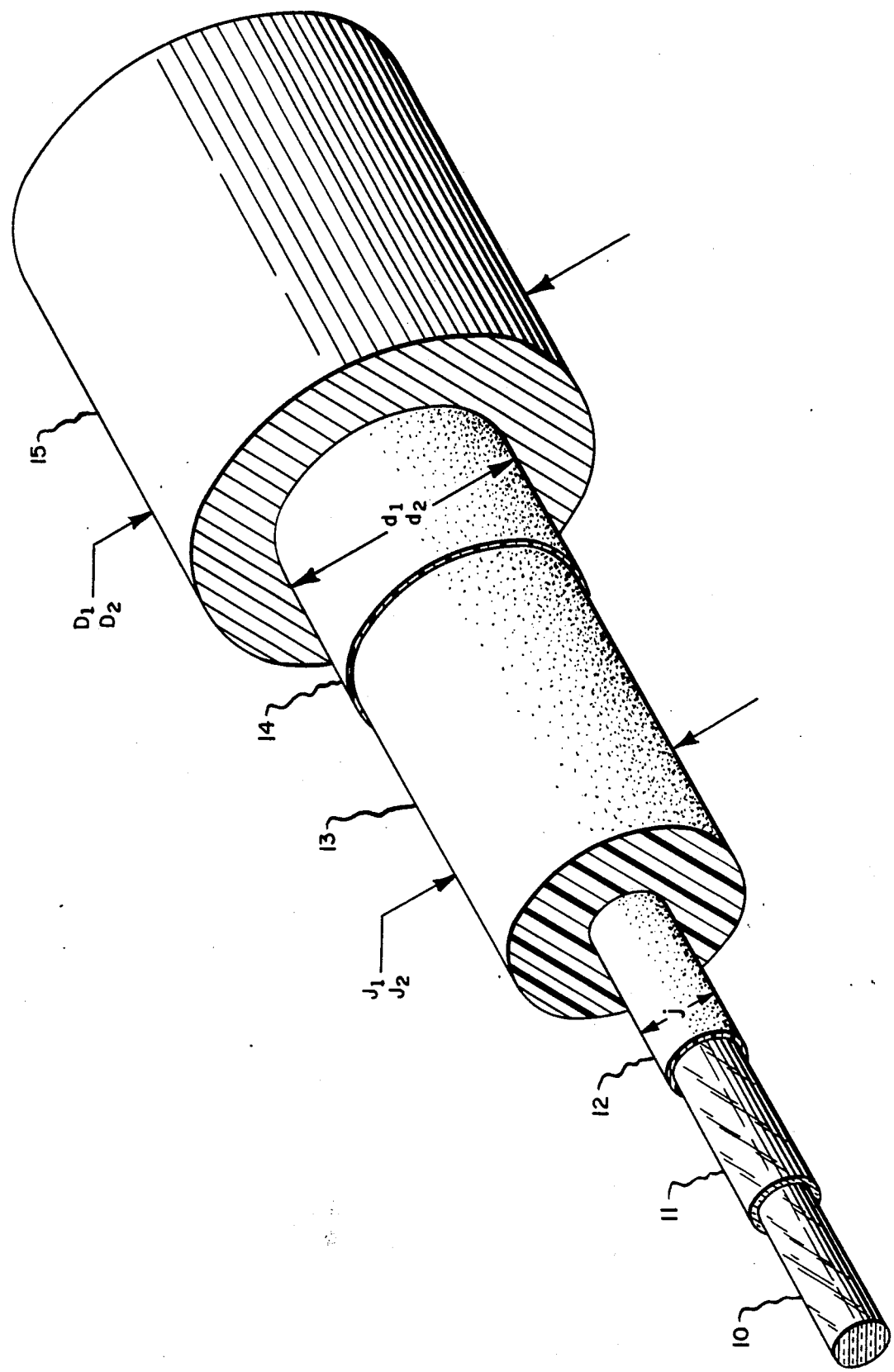

4,687,293

METAL-ENCASED LIGHT CONDUCTOR

FIELD OF THE INVENTION

This invention relates to the field of light conductors, and more particularly to an improved metal-encased light conductor.

BACKGROUND OF THE INVENTION

An optical fiber encased in a metal sheath which compresses an intermediate layer of material surrounding the optical fiber is known, as shown by the following two patents.

Thus, U.S. Pat. No. 4,214,693 discloses a stranded conductor surrounded by electrical insulating material which in turn is surrounded by a metal sheath. The conductor may be stranded copper, or one or more of the conductors may be strands of a material suitable for practice of "fiber optics", typically glass fibers or coated glass fibers. According to the patent's disclosure, the "fiber optics" material may be used alone, without any metal conductors. The insulating material may be a thermoplastic material such as polytetrafluoroethylene, or a fully fluorinated copolymer of hexafluoropropylene and tetrafluoroethylene, or propylene polymers and copolymers. Where "fiber optics" material is used, the amount of other insulating material required is reduced, and may, in some cases, be entirely eliminated. The metal sheath is preferably made of stainless steel and is swaged. The end product is a wireline utilized to suspend a downhole tool in an earth borehole from an aboveground cable drum, and to transmit signals between such tool and above ground-equipment.

U.S. Pat. No. 4,381,141 discloses an optical fiber produced by preparing a preform of a core and clad both made of metal halogenides or arsenic-selenium glass, applying a lubricant to the outer surface of the preform, vacuum sealing the preform within a metal pipe, made of copper or aluminum, and drawing the metal pipe through a die at a temperature below the melting point of the preform, to reduce diameter and elongate. The lubricant may be a fluorine type resin, a fluorine type polyolefin, a polyolefin polymer such as polyethylene or boron nitrides.

SUMMARY OF THE INVENTION

An object of the present invention is to provide a metal-encased light conductor having a continuous pressure boundary seal capable of use to transmit light signals in an environment having a pressure up to about 5000 pounds per square inch based on a minimum sealing length of 6 inches, and a temperature falling in the range of a low temperature such as about −40° C. to an elevated temperature such as about 250° C.

Another object of the present invention is to provide such a metal-encased light conductor which is easily sealed externally, so that the light conductor is adapted to be used to penetrate a bulkhead, without producing microbending of the light conductor.

A further object of the present invention is to provide such a special purpose light conductor which is protected by a metal sheath.

These and other objects and advantages are accomplished by providing an optical fiber including a light transmitting core surrounded by a cladding, a buffer coating the cladding composed of a polyimide, a jacket surrounding such buffer composed of thermoplastic material having a melting point above 200° C., an epoxy film on said jacket cured at a temperature of at least 100° C., and a mechanically reduced ductile metal sheath surrounding such epoxy film and compressing such jacket.

DESCRIPTION OF THE DRAWING

The drawing comprises a single FIGURE showing a fragmentary perspective view of the metal-encased light conductor embodying the present invention, in which portions of the component elements of the conductor have been successively broken away to reveal their external surfaces in elevation and their end faces in cross section.

DESCRIPTION OF THE PREFERRED EMBODIMENT

The light conductor structure embodying the present invention is shown as comprising an optical fiber including a core 10 surrounded by a cladding 11. Coating this cladding is a buffer 12. A uniformly thick thermoplastic jacket 13 surrounds the buffer. The jacket is covered by a thin epoxy film 14. A mechanically reduced metal sheath 15 surrounds the epoxy film and compresses jacket 13.

The core 10 and cladding 11 may be made of any material suitable for use as an optical fiber, such as silica glass or quartz. Dimensionally the core 10 may typically have an outside diameter of about 200 microns or about 0.00787 inch, and the outside diameter of the cladding 11 will then typically be about 240 microns or 0.00945 inch. This core/clad optical fiber is coated with a high strength and high temperature buffer, specifically a polyimide thermoplastic such as one marketed by E. I. duPont under the trademark "Kapton". An optical fiber including such a core 10, cladding 11 and polyimide buffer 12 can be procured as a unitized commercial article.

The thermoplastic jacket 13 is applied as a uniformly thick layer over buffer coating 12 in any suitable manner, preferably by extrusion. Relating the jacket 13 to the optical fiber having the typical dimensions previously mentioned, the jacket will typically have an outside diameter of about 914 microns or 0.036 inch. A thermoplastic material capable of withstanding a temperature of at least 200° C. is utilized. Preferably, is is selected from the group consisting of: a copolymer combining the carbon-fluorine backbone of fluorocarbons with perfluoroalkoxy side chains, such as resins marketed by E. I. duPont under the trademark "Teflon PFA"; a polyether ether ketone, such as resins marketed by Imperial Chemical Industries Limited under the trademark "Peek"; and an ethylene-tetra-fluoroethylene copolymer, such as resins marketed by E. I. duPont under the trademark "Tefzel".

The thermoplastic jacket 13 is then wiped with a thin film 14 of a suitable high temperature epoxy adhesive material, such as "TRA-BOND 2211" or "TRA-BOND 2215" marketed by Tra-Con, Inc. The former is an epichlorohydrin/aromatic amine, and the latter is a bis-phenol A/anhydride. This film has no significant thickness.

The assembly is then slid into a metal sheath suitably dimensioned internally to accommodate this assembly, before being mechanically reduced. Any excess of epoxy is wiped off, or redistributed circumferentially about jacket 13, by this insertion. The metal sheath may be made of any suitable ductile material such as stainless steel, titanium, nickel and copper. If 304 stainless steel is considered as the metal of which the starting sheath is composed, it will have typically a wall thickness of about 0.010 inch, an outside diameter of about 2032 microns or 0.080 inch, and hence an inside diameter of a 0.060 inch. The starting metal sheath is then suitably mechanically reduced to reduce its inside diameter to slightly less than the outside diameter of thermoplastic jacket 13, and thereby compress this jacket radially inwardly to embrace the inner elements 10-12 of the optical fiber. In this case, the metal sheath with the assembly therewithin is swaged in two passes through hammer dies, successively having openings of 0.062 inch and 0.058 inch. The wall of the metal sheath increases in thickness to about 0.012 inch, as a result of this swaging. More importantly, the thermoplastic jacket 13 is placed in a state of compression, and this provides an effective continuous pressure boundary seal axially along the interfaces between the various elements of the optical fiber structure.

As a consequence of the mechanical reduction of the typical metal sheath previously described, there should be produced a reduction in area of the metal sheath of about 20%, i.e., ±1%. This can be expressed by the following equation:

percentage of area reduction of metal sheath =

$$\frac{(A_1 - a_1) - (A_2 - a_2)}{A_1 - a_1}$$

where pre-swage:
$A_1$ = area of outside diameter of metal sheath
$a_1$ = area of inside diameter (bore) of metal sheath
and post-swage:
$A_2$ = area of outside diameter of metal sheath
$a_2$ = area of inside diameter of metal sheath
Since area is equal to $\pi r^2$ or $$\frac{\pi}{4} D^2 \text{ and } \frac{\pi}{4}$$

is common to the latter expression, the above equation can be rewritten as:

percentage of area reduction of metal sheath =

$$\frac{(D_1^2 - d_1^2) - (D_2^2 - d_2^2)}{(D_1^2 - d_1^2)}$$

Substituting the dimensions stated in the above example:

percentage of area reduction of metal sheath =

$$\frac{[0.08]^2 - [0.08 - 2(0.01)]^2 - [0.059]^2 + [0.059 - 2(0.012)]^2}{[0.08]^2 - [0.08 - 2(0.01)]^2}$$

$$= 19\%$$

The above-described reduction in area of the metal sheath 15 should compress the thermoplastic jacket 13 to produce a reduction in area of this jacket falling in the range of from about 15% to about 25%. Below this lower limit, the leakage rate is too high and hence unacceptable. Above this higher limit the optical integrity of the core/clad/buffer assembly is adversely affected.

The percentage of area reduction of the thermoplastic jacket 13 can be expressed by the following equation:

percentage of area reduction of thermoplastic jacket =

$$\frac{(J_1^2 - j_1^2) - (J_2^2 - j_1^2)}{J_1^2 - j_1^2}$$

where pre-swage:
$J_1$ = original outside diameter of thermoplastic jacket
$j_1$ = inside diameter of thermoplastic jacket (equal to outside diameter of buffer)
and post-swage:
$J_2$ = reduced outside diameter of thermoplastic jacket
For example, assuming:
$J_1$ = 0.036 inch
$j_1$ = 0.010 inch
$J_2$ = 0.033 inch
and substituting these values in the above equation, there results:

percentage of area reduction of thermoplastic jacket =

$$\frac{(0.036)^2 - (0.01)^2 - (0.033)^2 + (0.01)^2}{(0.036)^2 - (0.01)^2}$$

$$= \frac{(0.036)^2 - (0.033)^2}{(0.036)^2 - (0.01)^2}$$

$$= 17\%$$

Typical boundary seal leakage in a 6 inch long section of light conductor is less than $1 \times 10^{-6}$ standard cubic centimeters of helium per second at a pressure of 100 psi.

Percentage of area reduction of the thermoplastic jacket 13 related to the design basis leak rate for a 6 inch seal length can be tabulated as follows:

| % | Leak rate (scc He/sec) |
|---|---|
| 15 | $1 \times 10^{-6}$ |
| 25 | $1 \times 10^{-8}$ |

After swaging, the optical fiber structure is subjected to a temperature of about 100° C. for 2 hours is the TRA-BOND 2211 epoxy adhesive was used, or to a temperature of about 220° C. for 4 hours if the TRA-BOND 2215 epoxy adhesive was used, in order to cure the epoxy. While the cured epoxy film 14 has no significant thickness, it has been found essential to have the film if the final structure is employed in an environment where a cryogenic temperature of as low as −40° C. obtains and a continuous boundary seal, under either a high vacuum or a positive pressure of as high as 5000 psi, is to be maintained. It has also been found that if no epoxy film is employed and the same starting size assembly is swaged in a final pass having a hammer die opening of 0.056 inch, the resultant swaged assembly will have an effective boundary seal in a temperature range down to only 0° C., rather than 40° C.

The inventive improved metal encased light conductor may have various applications. For example, a plurality of such conductors can be used in a bulkhead feedthrough into a hydrogen atmosphere at 100° C., for association with optical fiber sensors on generator cables. As another example, a single inventive conductor penetration can be used with sensors in the irradiation of fruit and vegetables. Still a further example is a three conductor penetration into a vacuum at room temperature, used in laser research. A further example is a two conductor arrangement for use in measuring stress on the tail section of aircraft. By using a copper sheath instead of a stainless steel sheath, the inventive light conductor can be used in a radar system. By using for the metal sheath, a type of stainless steel containing a high concentration of nickel, known as Hastaloly-C, the inventive light conductor is suitable for use in an acid environment.

The light conductor structure embodying the present invention isolates the area to seal around the exterior of the metal sheath to a very small area around each conductor, minimizing failure probability. The inventive light conductor allows for ease of replacement of conductors, especially in a multiple conductor penetration. As many as 52 conductors may be employed in a single penetration. The inventive metal-encased light conductor structure is relatively immune to temperature cycling over a larger range than if the optical fiber were potted in an epoxy resin alone. The seal of the inventive structure provides a seal dependent in effectiveness upon the length of the metal sheath, thus by lengthening the structure an easy way is provided to improve the pressure rating and lead rates.

While variations in the preferred optical fiber structure illustrated and described may occur to those skilled in the art without departing from the principle of the invention, it is intended that the scope of the present invention be measured by the appended claims considered in the light of the foregoing disclosure.

What is claimed is:
1. A metal-encased light conductor having a continuous pressure boundary seal capable for use in an environment having a pressure up to about 5000 pounds per square inch based on a sealing length of a minimum of 6 inches and a temperature falling in the range of from about −40° C. to about 250° C., comprising:
   an optical fiber including a core surrounded by a cladding,
   a buffer coating said cladding composed of a polyimide,
   a uniform jacket surrounding said buffer composed of thermoplastic material having a melting point above 200° C.,
   an epoxy film on said jacket cured at a temperature of at least 100° C., and
   a mechanically reduced ductile metal sheath surrounding said film and compressing said jacket.
2. A light conductor according to claim 1 in which the cross sectonal area of the thermoplastic jacket has been reduced about 15 to 25% in order to attain effective sealing.
3. A light conductor according to claim 1 in which said epoxy material is epichlorohydrin/aromatic amine cured at a temperature of about 100° C. for about 2 hours.
4. A light conductor according to claim 1 in which said epoxy material is bis-phenol A/anhydride cured at a temperature of about 220° C. for about 4 hours.
5. A light conductor according to claim 1, 2, 3 or 4 in which the thermoplastic material for said jacket is selected from the group consisting of (1) a copolymer combining the carbon-fluorine backbone of fluorocarbons with perfluoroalkoxy side chains, (2) a polyether ether ketone, and (3) an ethylene-tetra-fluoroethylene copolymer.

* * * * *